United States Patent [19]

Doerge

[11] 4,430,490

[45] Feb. 7, 1984

[54] POLYETHER POLYOLS AND THEIR METHOD OF PREPARATION

[75] Inventor: Herman P. Doerge, Oakmont, Pa.

[73] Assignee: PPG Industries, Inc., Pittsburgh, Pa.

[21] Appl. No.: 406,814

[22] Filed: Aug. 10, 1982

[51] Int. Cl.$^3$ .............................................. C08G 18/48
[52] U.S. Cl. ...................................... 528/77; 521/175;
536/18.3; 536/121; 568/607; 568/608; 568/618; 568/621
[58] Field of Search ............... 568/618, 621, 607, 608; 536/18.3, 121; 521/175; 528/77

[56] References Cited

U.S. PATENT DOCUMENTS

| 3,000,963 | 9/1961 | Speranza | 568/621 |
|---|---|---|---|
| 3,153,002 | 10/1964 | Wismer et al. | 528/77 |
| 3,299,151 | 1/1967 | Wismer et al. | 260/615 |
| 4,110,268 | 8/1978 | Longley et al. | 521/177 |

FOREIGN PATENT DOCUMENTS 56-112931  9/1981  Japan .

*Primary Examiner*—Lucille M. Phynes
*Attorney, Agent, or Firm*—Linda Pingitore; William J. Uhl

[57] ABSTRACT

Polyether polyols and their method of preparation are disclosed. The polyether polyols are prepared by reacting polyhydric alcohols with an alkylene oxide in the presence of an alkaline catalyst. The reaction mixture is then treated with a hydroxy-carboxylic acid so as to neutralize the alkaline catalyst and form a clear reaction mixture without otherwise removing the alkaline catalyst. The polyether polyols are useful for the production of polyurethane foams.

15 Claims, No Drawings

POLYETHER POLYOLS AND THEIR METHOD OF PREPARATION

BACKGROUND OF THE INVENTION

1. Field of the Invention

The present invention relates to polyether polyols, their method of preparation, and to polyurethane compositions prepared with the polyether polyols.

2. Brief Description of the Prior Art

Polyether polyols are known in the art for the preparation of polyurethane foams. The polyether polyols are prepared by reacting a polyhydric alcohol such as sucrose with an alkylene oxide such as ethylene or propylene oxide in the presence of an alkaline catalyst such as sodium hydroxide. After reaction, the alkaline catalyst must be removed from the reaction mixture for the production of satisfactory polyurethane foams. Normally, the polyether polyol is treated with an acidic material such as phosphoric acid so as to neutralize the alkaline catalyst. This results in the precipitation of the salt which must also be removed for the production of satisfactory polyurethane foams. One of the disadvantages associated with such a process is that in removing the salt from the reaction mixture, a considerable amount of polyether polyol is lost. Also, the removed salt and polyol can pose a disposal problem.

Examples of prior art are U.S. Pat. No. 3,000,963 which discloses treating polyether polyols containing alkaline catalyst with a solid organic acid so as to form an insoluble salt which is then removed by filtration. U.S. Pat. No. 3,299,151 discloses treating polyether polyols which contain an alkaline catalyst with formic acid so as to precipitate substantially all of the catalyst and removing the precipitate by filtration or centrifugation.

The present invention differs from the prior art in that the polyether polyol containing the alkaline catalyst is treated with a hydroxy-carboxylic acid so as to form a salt which is soluble in the polyether polyol giving a clear reaction mixture. Reaction mixtures which contain insoluble salts are unsatisfactory for use with modern polyurethane processing equipment, whereas polyether polyols which contain the soluble salts of the present invention can be satisfactorily used in modern polyurethane processing equipment.

Besides the above-mentioned prior art, reference is also made to U.S. Pat. No. 4,110,268 which discloses treating polyether polyols which contain alkaline catalyst with oleic acid or mixtures of oleic acid and higher molecular weight alkyl benzene or alkyl toluene sulfonic acids such as dodecylbenzene sulfonic acid. The resultant neutralized salt is soluble in the polyether polyol composition. However, it appears that these particular salts have catalytic activity for a subsequent polyurethane foaming reaction. This can be a disadvantage in that it reduces the control over the polyurethane foaming reaction. Normally, polyurethane foaming reactions are catalyzed with amines in a well-known and well-defined manner. Foaming times are easily adjusted by the type and amount of the well-known amine catalyst. Neutralizing with the acids disclosed in U.S. Pat. No. 4,110,268 can present problems of controlling the catalysis of the polyurethane foaming reaction. In the present invention, on the other hand, salts formed by the hydroxy-carboxylic acids have no appreciable catalytic activity for the polyurethane foaming reaction, and, therefore, the well-known amine catalyst can be used.

SUMMARY OF THE INVENTION

In accordance with the present invention, a process for the preparation of liquid polyether polyols is provided. The process comprises reacting a polyhydric alcohol with an alkylene oxide in the presence of an alkaline catalyst. After completion of the reaction to produce the polyether polyol, the reaction mixture is treated with a hydroxy-carboxylic acid adapted to neutralize the alkaline catalyst to provide a soluble neutralized catalyst and produce a clear reaction mixture without otherwise having removed the alkaline catalyst from the reaction mixture.

The invention also provides for liquid polyether polyol compositions containing the polyether polyol soluble salt of a hydroxy-carboxylic acid and the alkaline catalyst used in the preparation of the polyether polyol, and for polyurethane compositions comprising the reaction product of the aforedescribed polyether polyols and organic polyisocyanates.

DETAILED DESCRIPTION

The polyether polyols are prepared by means well known in the art. This involves reacting an alkylene oxide with a polyhydric alcohol in the presence of an alkaline catalyst. Among the polyhydric alcohols which may be used are ethylene glycol, diethylene glycol, higher polyethylene glycols, propylene glycol, butylene glycol, glycerol and higher polyglycerols, pentaerythritol, sorbitol, mannitol, sucrose, trimethylolpropane, trimethylolbenzene, trimethylolphenols, and mixtures of the above. Polyether polyols formed at least in part from sucrose are preferred. Examples of alkylene oxides are ethylene oxide, propylene oxide, butylene oxide, including mixtures thereof, with propylene oxide and mixtures of ethylene oxide and propylene oxide being preferred. Examples of suitable alkaline catalysts are sodium and potassium hydroxide, and their corresponding hydrides and alkoxides.

In general, reaction occurs by contacting the polyhydric alcohol with the alkylene oxide at an elevated temperature in the range of about 50° to 150° C. under moderately elevated pressures and in the presence of the alkaline catalyst. The amounts of polyhydric alcohol and alkylene oxide which are used are preferably about 2 to 25 equivalents of alkylene oxide per mole of polyhydric alcohol. Typically, the reaction product has an average hydroxyl value of at least 10, most preferably in the range of 150 to 750.

After preparation of the polyether polyol, the resultant reaction mixture which contains the alkaline catalyst usually in amounts of about 0.01 to 1 percent by weight based on weight of the polyether polyol (reaction product of polyhydric alcohol and alkylene oxide) is neutralized with the hydroxy-carboxylic acid. Neutralization can be accomplished by simply mixing the two at ambient conditions and mildly stirring. The neutralization need not be to exact neutrality and the neutralization may have an apparent slight acidity or alkalinity. Preferably, neutralization is conducted such that the pH of the acidified polyether polyol is from about 8.0 to about 2.0, preferably 8 to 4. The neutralized catalyst should be soluble in the polyether polyol so that the resultant product can be used satisfactorily in polyurethane foaming equipment. If such solubility does not exist, as evidenced, for example, by the formation of a hazy mixture, the present invention is not applicable to such a situation.

Examples of suitable hydroxy-carboxylic acids are lactic acid, salicylic acid, substituted salicylic acid such as 2-hydroxy 3-methyl benzoic acid, 2-hydroxy 4-methyl benzoic acid, and mixtures of such acids. Lactic acid is preferred.

The resultant reaction mixture which is clear, that is, free from haze, can then be used for subsequent polyurethane foaming reaction, as is well known in the art. For polyurethane foaming reactions, the polyether polyol is reacted with an organic polyisocyanate. Examples of suitable polyisocyanates include 2,4-toluene diisocyanate, 2,6-toluene diisocyanate, as well as isomeric mixtures of such isocyanates. Examples of other isocyanates are diphenylmethane-4,4'-diisocyanate, 4,4'-methylene-biscyclohexyl diisocyanate, isophorone diisocyanate and polymethylene polyphenyl isocyanates which are sold under the trademark PAPI commercially available from Upjohn Company.

Reaction of the polyether polyols with the polyisocyanates to form polyurethane foams is well known in the art and is disclosed in U.S. Pat. Nos. 3,072,582; 3,245,924; 3,265,641 and 3,682,845.

Polyurethane foaming compositions contain emulsifiers, stabilizers, blowing agents such as fluorocarbons, and catalyst such as amine catalyst. Preparation can be by the so-called one-shot method or the prepolymer method. The resultant polyurethane foams can be rigid or flexible as is known in the art.

The following examples illustrate the invention. The examples are not intended to limit the invention for there are, of course, numerous possible variations and modifications of the examples which can be used in practicing the present invention. Unless otherwise indicated, all parts are by weight.

EXAMPLES

The following examples show the preparation of various liquid polyether polyols wherein polyhydric alcohols are reacted with alkylene oxide in the presence of an alkaline catalyst. The resulting polyether polyols were then treated with various acids to neutralize the catalyst. The solubility of the resulting salts was noted. The polyether polyols were then reacted with organic polyisocyanates for the manufacture of polyurethane foams and the effects of the various salts on the polyurethane foaming reactions were noted.

EXAMPLES A AND B

These examples show the preparation of liquid polyether polyols wherein sucrose is reacted with propylene oxide (Example A) and mixtures of ethylene oxide and propylene oxide (Example B) in the presence of sodium hydroxide catalyst.

EXAMPLE A

A sucrose polyether polyol was prepared as follows:

A mixture of 4300 parts by weight (pbw) of sucrose in 766 pbw of water was prepared at 190° F. (87° C.). To this mixture was added 136 pbw of a 50 percent aqueous solution of sodium hydroxide. The resulting mixture was then charged to a reactor and heated to 220° F. (105° C.). Propylene oxide (5100 pbw) was added gradually over a period of about 3 hours at between 220°–250° F. (105°–121° C.) and a maximum pressure of 80 pounds per square inch (psi) (2952 newton/meter$^2$ [n/m$^2$]). After the propylene oxide was added, the reaction product was held for one-half hour at 240° F. (116° C.).

The reaction product was then transferred to a stripping kettle and stripped at 250° F. (121° C.) and less than 0.5 psi (18.45 n/m$^2$) vacuum to remove water.

The stripped reaction product was transferred back to the reactor and an additional 9400 pbw of propylene oxide added at between 220°–265° F. (105°–129° C.) over about a 4-hour time period at a maximum pressure of 80 psi (2952 n/m$^2$). After the propylene oxide addition was completed, the product was held for one hour at 250° F. (121° C.).

EXAMPLE B

A sucrose polyether polyol was prepared as follows:

A mixture of 5390 pbw of sucrose in 1025 pbw of water was prepared at 190° F. (88° C.). To this mixture was added 162 pbw of a 50 percent aqueous solution of sodium hydroxide. The resultant mixture was charged to a reactor and heated to 200°–210° F. (93°–99° C.). Propylene oxide (10260 pbw) was added gradually over a period of approximately 4½ hours at between 200°–255° F. (93°–124° C.) and a maximum pressure of 80 psi (2952 n/m$^2$). After the addition was completed, the reaction mixture was held for 30 minutes at 230°–240° F. (110°–116° C.). Ethylene oxide (2825 pbw) was then added gradually over a period of about 1½ hours at 200°–240° F. (93°–116° C.) and a maximum pressure of 80 psi (2952 n/m$^2$). After the ethylene oxide addition was completed, the mixture was held for one hour at 220°–230° F. (104°–110° C.).

EXAMPLES 1–8

The following examples show treatment of the polyether polyols of Example A with various acids to neutralize the sodium hydroxide catalyst.

EXAMPLE 1

The sucrose polyol (1750 pbw) prepared as described in Example A was mixed with 30 pbw of lactic acid (88 percent in water). The pH of a 50 percent resin-50 percent water solution was 5.9. The mixture was vacuum stripped at 300° F. (149° C.) for 15 minutes at 15 mm. Hg. A clear resin having a hydroxyl value of 345, a percent water of 0.063 and a Brookfield Viscosity at 77° F. (25° C.) of 15,200 centipoises was obtained.

EXAMPLE 2

The sucrose polyol (500 pbw) prepared as described in Example A was mixed with 6.0 pbw of salicylic acid. The pH of a 50 percent resin-50 percent water solution was 5.0. The mixture was vacuum stripped at 300° F. (149° C.) for 15 minutes at 15 mm. Hg. A clear resin was obtained.

EXAMPLE 3

The sucrose polyether polyol prepared as described in Example A was transferred to a stripping kettle and cooled to 180°–190° F. (82°–88° C.). A solution of 115 pbw of 85 percent phosphoric acid in 770 pbw of water was added and mixed for 30 minutes. The pH of a 50 percent resin-50 percent distilled water mixture was adjusted with additional acid solution to obtain a pH of about 6.3. The mixture was then vacuum stripped at 300° F. (149° C.) at less than 0.5 psi (18.45 n/m$^2$) vacuum until the water content of the polyol was less than 0.1 percent. The mixture which contained a precipitated phosphate salt of the alkaline catalyst was hazy. The mixture was then transferred to a centrifuge to remove the salt. After centrifuging, the polyol was filtered to remove residual solid salt. A clear resin having a hydroxy value of 340, a water content of 0.10 percent and a Brookfield Viscosity at 77° F. (25° C.) of about 9,000 centipoises was obtained.

EXAMPLE 4

The sucrose polyol (432.8 pbw) prepared as described in Example A was charged to a vacuum stripping kettle along with 6.5 pbw of propionic acid. The mixture was heated to 160° F. (71° C.) and held for 40 minutes. A pH of 50 percent resin in 50 percent distilled water was found to be 5.7. Vacuum was applied and the polyol stripped at 80 mm. Hg while heating to 305° F. (151° C.). The polyol was later restripped at 151° C. for 15 minutes under 16-18 mm. Hg. A clear resin was obtained having a hydroxyl value of 381, a water content of 0.08 percent and a Brookfield Viscosity at 77° F. (25° C.) of 10,800 centipoises.

EXAMPLE 5

The sucrose polyol (1950 pbw) prepared as described in Example A was mixed with 18 pbw of acetic acid. The pH of a 50 percent resin-50 percent water solution was 5.9. The mixture was vacuum stripped at 300° F. (149° C.) for 15 minutes at 15 mm. Hg. A clear resin was obtained having a hydroxyl value of 276, a percent water of 0.09 and a Brookfield Viscosity at 77° F. (25° C.) of 12,300 centipoises.

EXAMPLE 6

The sucrose polyol (1510 pbw) prepared as described in Example A was mixed with 35 pbw of dimethyl propionic acid. The pH of a 50 percent resin-50 percent water solution was 5.8. The mixture was vacuum stripped at 300° F. (149° C.) for 15 minutes at 15 mm. Hg. A resin containing solids having a hydroxyl value of 345, a percent water of 0.16 and a Brookfield Viscosity at 77° F. (25° C.) of 11,700 centipoises was obtained.

EXAMPLE 7

The sucrose polyol (1500 pbw) prepared as described in Example A was mixed with 52 pbw of neodecanoic acid. The pH of a 50 percent resin-50 percent water solution was 6.4. The mixture was vacuum stripped at 300° F. (149° C.) for 15 minutes at 15 mm. Hg. A clear resin having a hydroxyl value of 373 and a percent water of 0.06 was obtained.

EXAMPLE 8

The sucrose polyol (1710 pbw) prepared as described in Example A was mixed with 33 pbw of SULFRAMIN ACID 1298[1]. The pH of a 50 percent resin-50 percent water solution was 6.3. The mixture was vacuum stripped at 300° F. (149° C.) for 15 minutes at 15 mm. Hg. A clear resin having a hydroxyl value of 336, a percent water of 0.095 and a Brookfield Viscosity at 77° F. (25° C.) of 11,800 centipoises was obtained.

[1]Available from Witco Chemical Corporation. Reported to be a mixture of 97% by weight linear dodecylbenzene sulfonic acid, 1.3% by weight sulfuric acid and 1.0% by weight unsulfonated material.

EXAMPLES 9-15

The following examples show reaction of the polyether polyols of Examples 1-8 with an organic polyisocyanate to form polyurethane foams. A premix of polyether polyol, amine catalyst, surfactant and blowing agent was first prepared from the following ingredients:

| Ingredients | Parts by Weight |
|---|---|
| Polyether Polyol of Examples 1-8 | 150 |
| POLYCAT 8[1] | 1.0 |
| L 5340[2] | 1.0 |
| FREON 11B[3] | 30.0 |

[1]Amine catalyst commercially available from Abbott Laboratories.
[2]Silicone surfactant commercially available from Union Carbide Corporation.
[3]Blowing agent, trichlorofluoromethane, commercially available from E. I. DuPont de Nemours and Company.

The above premix was cooled to 65° F. (18° C.) and 100 pbw of HYLENE TIC[1] at 75° F. (24° C.) was added with stirring. Stirring was conducted for 6 seconds. The material was poured in a gallon cup and the time when it began to cream and to rise was noted (cream time). The time was also recorded when the foam began to set or become rigid (set time). The results are reported in Table I below.

[1]Isocyanate-containing resin manufactured by E. I. Du Pont de Nemours and Company.

TABLE I

| Neutralizing Acid | Example Number pbw polyol | | | | | | |
|---|---|---|---|---|---|---|---|
| | 9 | 10 | 11 | 12 | 13 | 14 | 15 |
| Lactic (Example 1) | 150 | | | | | | |
| Phosphoric (Example 3) | | 150 | | | | | |
| Propionic (Example 4) | | | 150 | | | | |
| Acetic (Example 5) | | | | 150 | | | |
| Dimethyl propionic (Example 6) | | | | | 150 | | |
| Neodecanoic (Example 7) | | | | | | 150 | |
| Dodecylbenzene sulfonic (Example 8) | | | | | | | 150 |
| | | | | (pbw) | | | |
| POLYCAT 8 | 1.0 | 1.0 | 1.0 | 1.0 | 1.0 | 1.0 | 1.0 |
| L5340 | 1.0 | 1.0 | 1.0 | 1.0 | 1.0 | 1.0 | 1.0 |
| FREON 11B | 30 | 30 | 30 | 30 | 30 | 30 | 30 |
| HYLENE T1C | 100 | 100 | 100 | 100 | 100 | 100 | 100 |
| Premix Temp. °C. | 18 | 18 | 18 | 18 | 18 | 18 | 18 |
| Isocyanate Resin Temp. °C. | 24 | 24 | 24 | 24 | 24 | 24 | 24 |
| Mix in seconds | 6 | 6 | 6 | 6 | no | 6 | 6 |
| Cream Time in seconds | 50 | 52 | 23 | 28 | foam made | 19 | 25 |
| Set Time in seconds | 114 | 150 | 48 | 58 | solid precipitate | 37 | 70 |

Examples 1-8 show that phosphoric acid forms a polyol insoluble salt which must be physically removed from the polyol. The organic acids form polyol soluble salts. However, only the hydroxy-carboxylic acid lactic acid had appreciably no catalytic effect in the polyurethane foaming reaction. Example 9 using lactic acid gave about the same cream and set times as Example 10 in which the acid salt was removed. The other organic acids which were not hydroxy functional had an apparent catalytic effect in the forming reaction with the exception of dimethyl propionic acid which produced a precipitate and from which no foam was made. Salicylic acid was not evaluated for its effect on foaming.

EXAMPLES 16-17

These examples show treatment of the polyether polyols of Example B with phosphoric acid and lactic acid to neutralize the sodium hydroxide catalyst.

EXAMPLE 16

The sucrose polyol prepared as described in Example B was cooled to 180° F. (82° C.). A solution of 217 pbw of phosphoric acid (85 percent) in 344 pbw of water was added and mixed for 30 minutes. The pH of a 50 percent resin-50 percent water solution was adjusted with additional acid solution to obtain a pH of about 6.0. To this mixture was added a solution of 150 pbw of disodium hydrogen phosphate in 420 pbw of water. After mixing for 30 minutes, the reaction mixture was vacuum stripped at 350° F. (177° C.) at less than 0.5 psi (18.45 n/m$^2$). The polyol mixture was centrifuged and filtered to remove the insoluble solid salts. A clear resin having a hydroxyl value of 465, a water content of 0.1 percent and a Brookfield Viscosity at 77° F. (25° C.) of about 25,000 centipoises was obtained.

EXAMPLE 17

The sucrose polyol (1000 pbw) prepared as described in Example B was mixed with 20.0 pbw of lactic acid (88 percent in water). The pH of a 50 percent resin-50 percent water solution was 4.4. The mixture was vacuum stripped at 300° F. (149° C.) for 15 minutes at 15 mm. Hg. A clear resin having a hydroxyl value of 463, a percent water of 0.03 and a Brookfield Viscosity at 77° F. (25° C.) of 28,000 centipoises was obtained.

EXAMPLES 18-19

The following examples show reaction of the polyether polyols of Examples 16 and 17 with an organic polyisocyanate to form polyurethane foams. A premix of polyether polyol, amine catalyst, surfactant and blowing agent was first prepared from the following ingredients:

| Ingredients | Parts by Weight |
|---|---|
| Polyether Polyol of Examples 16 and 17 | 100 |
| DABCO R8020[1] | 1.0 |
| DC 193[2] | 1.0 |
| FREON 11B | 25.0 |

[1]Amine catalyst commercially available from Air Products Corporation.
[2]Polysiloxane surfactant commercially available from Dow Corning Corporation.

The above premix was cooled to 65° F. (18° C.) and 105 pbw of VORANATO 3071[1] at 77° F. (25° C.) was added with stirring. Stirring was conducted for 10 seconds. The material was poured in a gallon cup and the time when it began to cream and rise was noted (cream time). The time was also recorded when the foaming mass began to set or become rigid (set time). The results are reported in Table II below.
[1]Isocyanate-containing resin commercially available from Dow Chemical Company.

TABLE II

| Neutralizing Acid | Example Number pbw polyol | |
|---|---|---|
| | 18 | 19 |
| Phosphoric (Example 16) | 100 | |
| Lactic (Example 17) | | 100 |
| DABCO R8020 | 1.0 | 1.0 |
| DC 193 | 1.0 | 1.0 |
| FREON 11B | 25.0 | 25.0 |
| VORANATO 3071 | 105.0 | 105.0 |
| Premix Temp. °C. | 18 | 18 |
| Isocyanate Resin Temp. °C. | 24 | 24 |
| Mix Time is seconds | 10 | 10 |
| Cream Time in seconds | 21 | 22 |
| Set Time in seconds | 63 | 61 |

The results presented in Table II show that lactic acid has no appreciable catalytic activity for foaming.

I claim:

1. In a process for the preparation of a liquid polyether polyol wherein a polyhydric alcohol is reacted with an alkylene oxide in the presence of an alkaline catalyst, the improvement which comprises treating the polyether polyol with a hydroxy-carboxylic acid adapted to neutralize the alkaline catalyst to provide a soluble neutralized catalyst and produce a clear reaction mixture without otherwise removing the alkaline catalyst from the reaction mixture.

2. The process of claim 1 in which the polyhydric alcohol is sucrose.

3. The process of claim 1 wherein the alkylene oxide is selected from the class consisting of ethylene oxide, propylene oxide, or mixtures thereof.

4. The process of claim 1 in which the alkaline catalyst is sodium hydroxide.

5. The process of claim 1 in which the hydroxy-carboxylic acid is selected from the class consisting of lactic acid, salicylic acid, a substituted salicylic acid, or mixtures thereof.

6. The process of claim 5 in which the acid is lactic acid.

7. A liquid polyether polyol composition containing a salt of a hydroxy-carboxylic acid and an alkaline catalyst used in the preparation of the polyether polyol; the salt being soluble in the polyether polyol.

8. The polyether polyol composition of claim 7 in which the polyether polyol is formed from reacting a polyhydric alcohol with an alkylene oxide in the presence of the alkaline catalyst.

9. The polyether polyol composition of claim 8 wherein the polyhydric alcohol is sucrose.

10. The polyether polyol composition of claim 8 in which the alkylene oxide is selected from the class consisting of ethylene oxide, propylene oxide, or mixtures thereof.

11. The polyether polyol composition of claim 7 in which the alkaline catalyst is sodium hydroxide.

12. The polyether polyol composition of claim 7 in which the hydroxy-carboxylic acid is selected from the class consisting of lactic acid, salicylic acid or a substituted salicylic acid, including mixtures thereof.

13. The polyether polyol composition of claim 12 in which the acid is lactic acid.

14. A polyurethane composition comprising the reaction product of an organic polyisocyanate and the polyether polyol composition of any of claims 7, 8, 9, 10, 11, 12 or 13.

15. The polyurethane composition of claim 14 in which the organic polyisocyanate is selected from the class consisting of 2,4-toluene diisocyanate, 2,6-toluene diisocyanate, mixtures of 2,4- and 2,6-toluene diisocyanate, and polymethylene polyphenyl isocyanate.

* * * * *